United States Patent [19]

Madan et al.

[11] Patent Number: 5,496,992
[45] Date of Patent: Mar. 5, 1996

[54] DUAL TRIGGER MULTIPLEXED DATA ENTRY TERMINAL

[75] Inventors: Esteban C. Madan; Randolph R. Beebe, both of Duluth; Teresa H. Stanfield, Lawrenceville, all of Ga.

[73] Assignee: LXE, Inc., Norcross, Ga.

[21] Appl. No.: 262,967

[22] Filed: Jun. 21, 1994

[51] Int. Cl.$^6$ .................................................. G06K 7/10
[52] U.S. Cl. ........................... 235/462; 235/472; 341/23; 364/709.14
[58] Field of Search .................................... 235/472, 462, 235/375; 364/709.14, 709.15; 341/23

[56] References Cited

U.S. PATENT DOCUMENTS

| | | | |
|---|---|---|---|
| 4,458,238 | 7/1984 | Learn | 340/365 R |
| 4,621,189 | 11/1986 | Kumar et al. | |
| 4,823,311 | 4/1989 | Hunter et al. | 364/709.14 |
| 4,850,009 | 7/1989 | Zook et al. | 235/472 |
| 4,916,441 | 4/1990 | Gombrich | |
| 5,065,003 | 11/1991 | Wakatsuki et al. | 235/375 |
| 5,155,659 | 10/1992 | Kunert | |
| 5,157,687 | 10/1992 | Tymes | |
| 5,218,187 | 6/1993 | Koenck et al. | |
| 5,218,188 | 6/1993 | Hanson | |
| 5,220,520 | 6/1993 | Kessoku | |
| 5,237,162 | 8/1993 | Harden et al. | 235/472 |
| 5,245,559 | 9/1993 | Lapeyre | 364/709.14 |
| 5,258,748 | 11/1993 | Jones | 364/709.14 |
| 5,287,384 | 2/1994 | Avery et al. | 375/1 |
| 5,354,977 | 10/1994 | Roustaei | 235/472 |

Primary Examiner—F. L. Evans
Attorney, Agent, or Firm—Jones & Askew

[57] ABSTRACT

A hand held data entry terminal that, upon initialization of a data entry program downloaded from a host computer, is capable of capturing product data, through either a terminal scanner or a data entry keypad, at locations remote from the host computer. A data entry program is downloaded to a battery-powered data entry terminal from a central host computer via an RF data transceiver located in the terminal. If the terminal scanner is functional and the product contains the necessary coded representations of data, the scanner may be enabled, through a first trigger located on a terminal handle, to scan the coded representations of data. Alternatively, the terminal operator may enter alpha/numeric product data through the terminal keypad. The data entry program contains a stack of key definition tables for the terminal keypad, allowing the terminal to be designed with a minimum number of data entry keys and a terminal display of maximum size. If the keypad mode of data entry is used, the terminal operator may scroll through the alternate key definition tables by using certain command keys, or via a second trigger located on the terminal handle, to select the proper key definition table for a particular mode of data entry or to select a particular data entry command. Regardless of the mode of data entry used, the data entered into the terminal is stored in a buffer at the terminal. Once all data has been entered into the buffer, the processor, upon receiving a SEND command, sends the data to the host computer via the terminal RF transceiver.

27 Claims, 6 Drawing Sheets

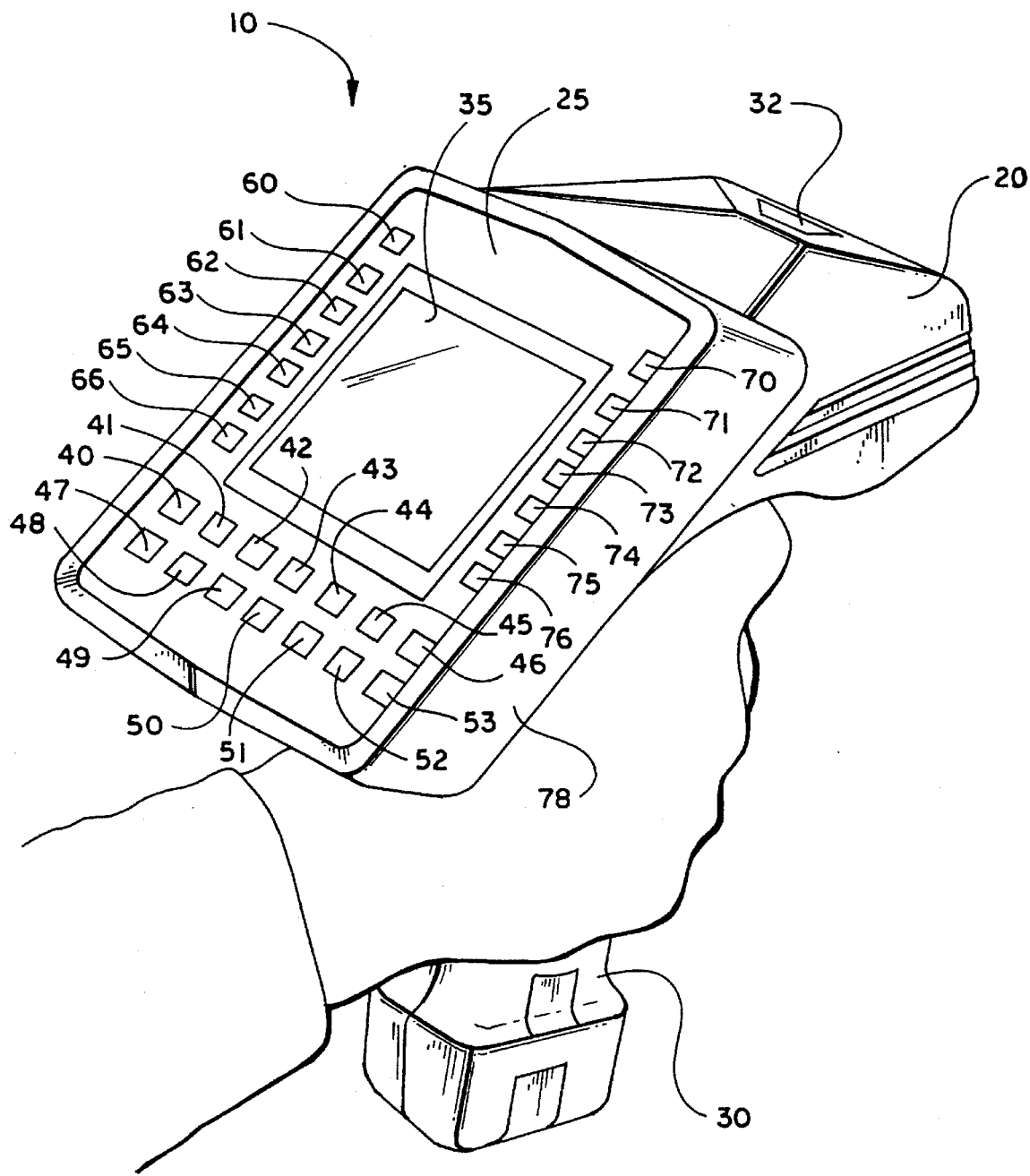
Fig_1

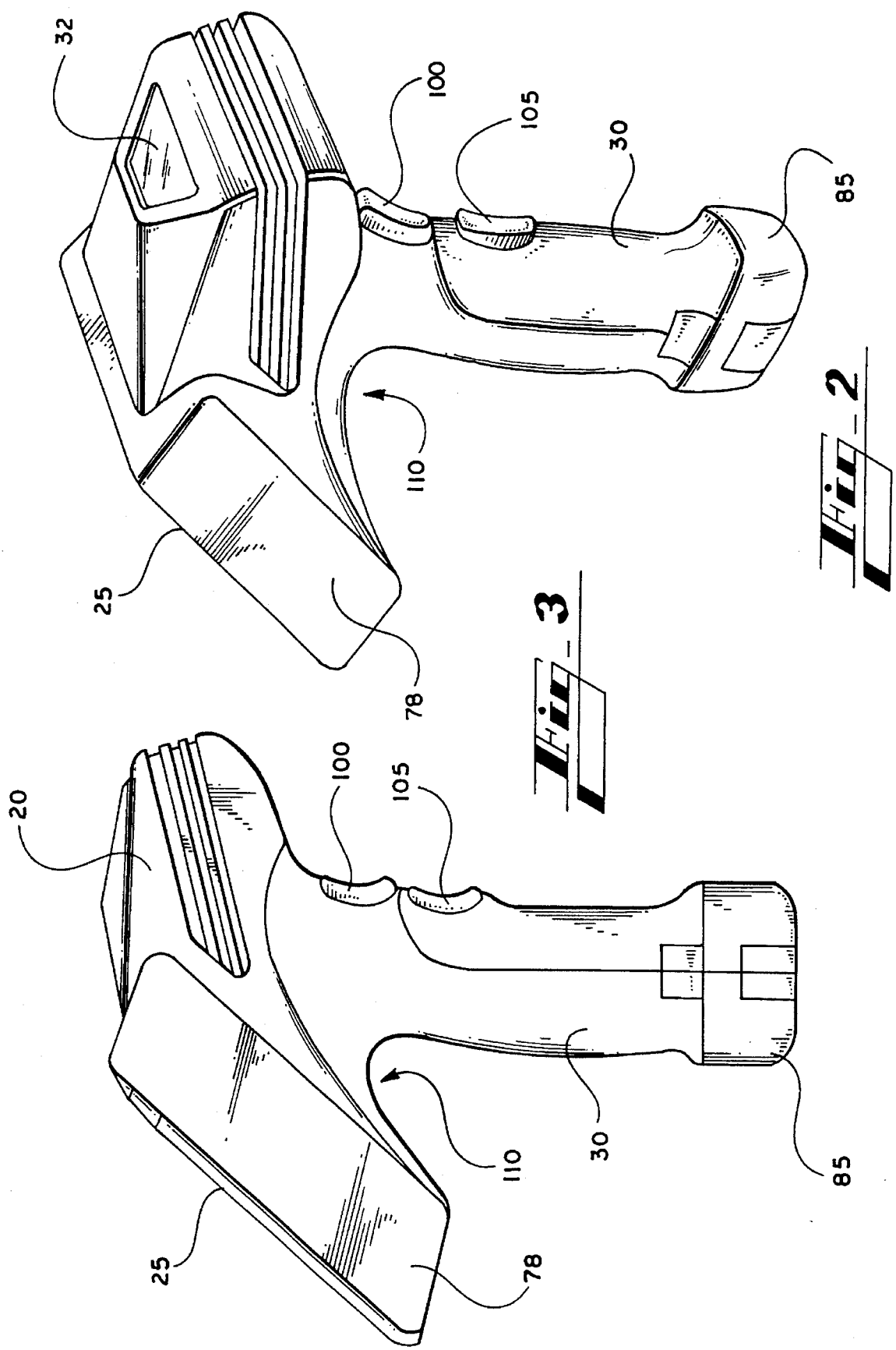

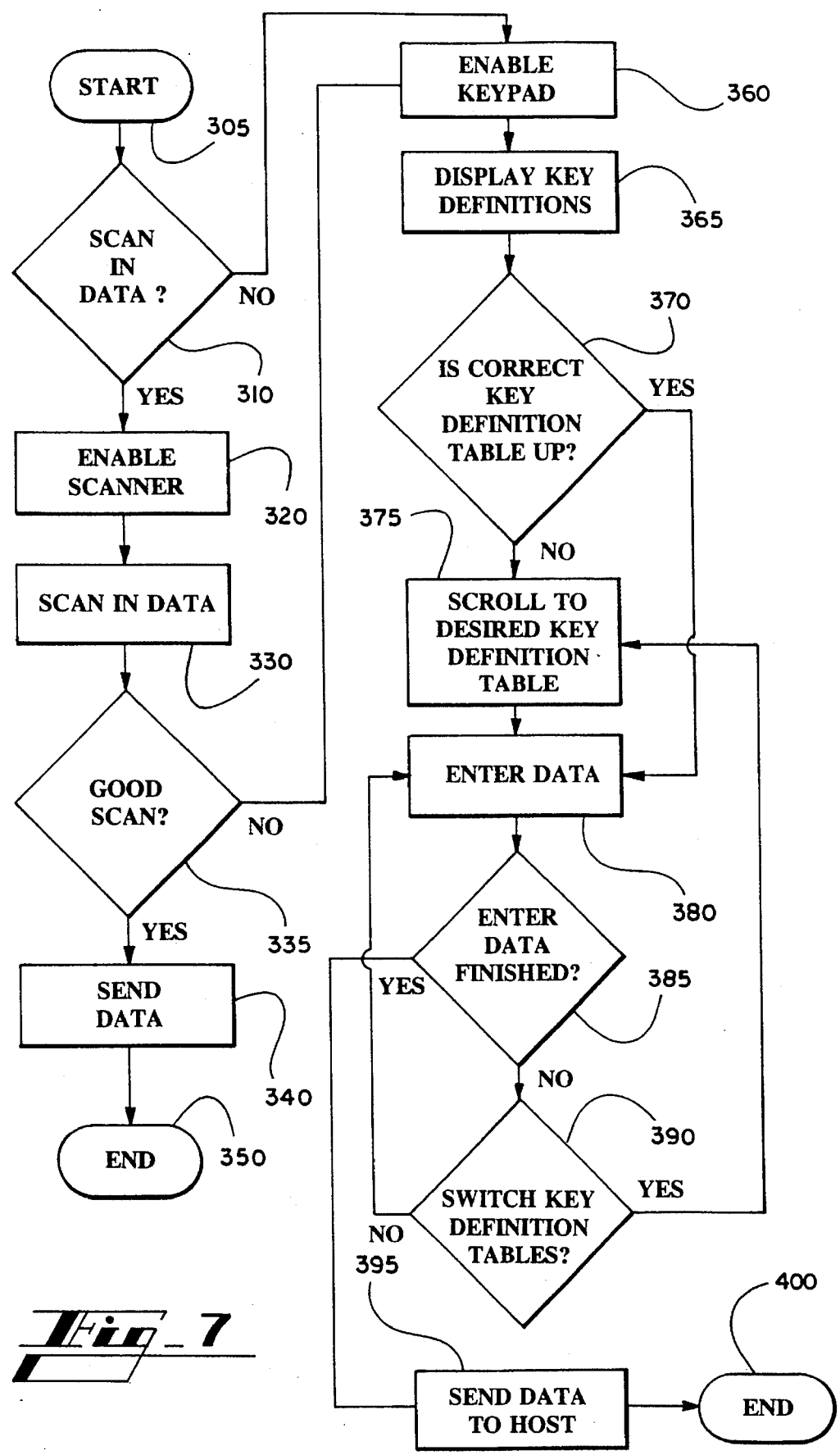
Fig_7

DUAL TRIGGER MULTIPLEXED DATA ENTRY TERMINAL

TECHNICAL FIELD

The present invention relates to a data capture device, and more particularly relates to a wireless handheld data entry terminal that has a plurality of multi-function programmable data entry keys and that, upon entry of data into the terminal, conveys the data to a central host computer by wireless communication means.

BACKGROUND OF THE INVENTION

The arrival, storage and shipment of goods to, in and from warehouses, factories and other large industrial facilities plays an essential role in the daily operation of many businesses. In order for these facilities to be run efficiently and profitably, it is important that the movement of goods is accurately tracked. Historically, goods have been tracked through the use of paper-intensive record systems. However, with the ever-increasing amount of goods being shipped and the myriad of shipping channels presently available, the need has arisen for more accurate tracking systems that do not generate the paper trail associated with previous systems. Further, the large size of many industrial facilities has spurred the need for accurate tracking systems that may be transported and operated at locations remote from a central tracking office.

In response to these needs, computerized data input terminals associated with central product and inventory databases are quickly replacing manual paper-based tracking systems. These terminals can efficiently track the movement of goods by eliminating much of the time, paperwork and human error associated with manual tracking of these goods. These terminals are used in warehouses and factories by forklift drivers, shipping and receiving clerks or other warehouse or factory personnel to track the arrival, storage and shipment of goods. Many of these conventional data input terminals include a housing with a handle, a face with a display, and a bar code scanner or means for connecting the terminal to a bar code scanner.

Presently, due to the prevalent use of bar codes for identifying and tracking goods, terminals having bar code scanners offer terminal operators a quick and easy way of obtaining information either from the containers in which particular goods are stored or from the goods themselves. By utilizing a data terminal with a scanner, a terminal operator avoids the cumbersome task of repeatedly typing data into the terminal via a terminal keypad. The terminal operator also need not worry about correctly reading the data from a product's label while he or she is typing the information into the terminal.

However, data terminals with scanners have associated drawbacks. Factories and warehouses are often dirty and damp and fluctuate widely in temperature. Terminal operators often do not use the utmost of care in handling and operating the terminals. As a result, the terminals often accumulate dirt and condensation and are exposed to a tremendous amount of abuse. Due to the fact that many of the scanners associated with these data terminals employ sensitive visible red scanning technology, the aforementioned dirt, condensation and/or abuse can cause the scanners to malfunction. Unless the data terminals have a backup method of data entry, the data terminals are rendered inoperative if and when the scanners malfunction. Also, important data not contained in the bar code information may need to be entered. This data is incapable of being entered by terminals having only a scanner form of data entry.

Data terminals with alternate keypad data entry systems avoid the aforementioned problem. If the scanner malfunctions on such a system, the terminal operator may continue to operate to the terminal by manually entering inventory data through the terminal keypad. Similarly, a terminal operator may enter data that could not otherwise be entered by a scanner, thus eliminating the need for the operator to record the data through written means. While not as fast and efficient as the scanner mode of data entry, .the keypad mode of entry minimizes terminal down-time due to scanner malfunction and scanner repair and offers the terminal operator greater flexibility in data entry functions.

As is often the case, however, warehouses often have poor lighting. The poor lighting makes it difficult to gather data from inventory shipping labels on the containers of goods in the warehouse. Even if a warehouse or factory is well lit, a terminal operator using a data input terminal with a keypad entry system at times must crawl between stacks of palletized goods, underneath storage shelves or through other limited access areas, which are difficult to light, to gather data from inventory shipping labels.

Even with the physical space taken by the keypad, a handheld data terminal with a keypad entry system should still have a display that is large enough to present a significant amount of information to the terminal operator to enhance ease of use of the terminal. However, as the size of the terminal display is increased, the space remaining for the terminal keys is decreased as a result.

As a result, the size of the terminal keys must either be decreased or the keys must be placed in closer proximity to each other. Subsequently, a terminal operator may experience difficulty in entering data, and thus commit data entry errors, if data entry keys are not of adequate size. A terminal operator also may experience difficulty in entering data if data entry keys are placed too closely to one another on the terminal, especially if the operator's hands and fingers are large. Regardless, a terminal must have enough input and command keys to allow an operator, in the absence of or during the malfunction of the terminal bar code scanner, to adequately enter appropriate product tracking information.

In addition, warehouses and factories are typically large facilities, often covering hundreds of thousands or even millions of square feet of floor space. A terminal operator must often cover a significant amount of territory in performing a daily data gathering routine. In covering this territory, a terminal operator often performs other physical tasks simultaneously with gathering data, such as climbing a ladder, driving a forklift or operating some other piece of machinery. Presently, many data terminals with keypad entry systems are not balanced and are designed so that the terminal operator must stop whatever task he or she is performing to hold the terminal in one hand and enter data with the other hand. These data entry terminals can thus make the operators' jobs even more difficult as the operators perform their jobs throughout the warehouse or factory over the course of a day.

In summary, a computerized hand-held data entry terminal with a large display limits the number of data input keys that can be provided on the face of the terminals, and thus limits the data gathering functions of the terminal. A terminal with a large number of data input keys limits the size of the terminal display and makes the display difficult to read in less than optimal warehouse and factory conditions. When a handheld terminal has an adequately sized display (the minimum desirable size of a terminal display is 16 × 20 characters) and the desired number of input keys, the operator often experiences the aforementioned problems with the terminal due to the large terminal size, the terminal weight and the corresponding improper terminal balance.

Thus, a need exists in the art for an ergonomically-balanced wireless handheld data entry terminal that has a scanner for data entry and an alternate keypad data entry system. The terminal must have both a display large enough to read in low visibility conditions and a plurality of multi-function keys that gives the data terminal a wide variety of data gathering functions. Further, a need also exists in the art for a wireless handheld data entry terminal designed in a manner that facilitates ease of data entry with one hand so that data can be entered simultaneously with the performance of another physical task by the terminal operator. Finally, a need exists in the art for a wireless handheld data entry terminal that is balanced and lightweight enough to facilitate ease of use, even when the terminal operator must cover a large area and carry it over the course of an entire day.

SUMMARY OF THE INVENTION

The present invention satisfies the above described needs by providing an ergonomically balanced wireless handheld data entry terminal that has both scanner and keypad data entry systems. The terminal has a display large enough to read in low visibility conditions and a plurality of multi function keys that gives the data terminal a wide variety of data gathering functions. Data may be entered into the wireless handheld data entry terminal with one hand. The wireless handheld data entry terminal is also balanced and lightweight, thus facilitating ease of use over an extended period of time.

Briefly described, a wireless data entry terminal constructed according to the preferred embodiment of the present invention has a terminal housing, a processor and data transceiver located within the housing, and a set of data entry keys on the housing. The processor runs a data entry program having a plurality of key definition tables. The data transceiver receives the program from a remote host computer, routing the program to the processor and transmitting data entered at the terminal from the terminal to the host computer. At least one key of the set of data entry keys is operative for scrolling through the plurality of key definition tables. A subset of the set of data entry keys is used for entering data in a manner defined by a key definition table selected from the plurality of key definition tables of the data entry program.

Each of the key definition tables has a corresponding key definition map that appears on the display to indicate the definition of each key for a particular key definition table. One key of the set of keys commands the data transceiver to send data to the host computer via the data transceiver.

A scanner is also located within the terminal housing for selectively scanning coded representations of data to be sent by the data transceiver to the remote host computer. A first trigger, located on a handle of the terminal, is operative to enable and disable the scanner. A second trigger, also located on the terminal handle, is operative to select a key definition table from the plurality of key definition tables.

The terminal also has a display for displaying the function associated with each specific key for a selected key definition table and for displaying data entered into the terminal before the data is sent to the host computer. The display is positioned so that a terminal operator may hold the terminal and enter data into the terminal while simultaneously reading the display. In addition, the terminal has a buffer allocated in non-volatile memory into which data is entered and stored until the data is sent by the data transceiver to the remote host computer.

In practicing the present invention, a host computer, a wireless data acquisition terminal having a processor, a data entry scanner, a plurality of data entry keys, and a display are provided, with the terminal being in communication with the host computer. A program having a plurality of key definition tables is downloaded from the host computer to the wireless data acquisition terminal. A key definition table is selected from the program at the wireless data acquisition terminal. Subsequently, the display indicates the key definition associated with each key in the selected key definition table. Prompts are provided at the display for data entry. The key definition tables may be selectively switched to allow for a variety of data entry registers. Data entered at the terminal is displayed and, upon all data being entered, is sent to the host computer via a wireless data transceiver in the terminal.

In practicing the present invention, a scanner may also be provided at the terminal to scan coded representations of data into the terminal. First and second control triggers may also be provided on the terminal. The scanner may be enabled and disabled by depressing the first control trigger on the terminal. The plurality of key definition tables may be scrolled through by depressing the second control trigger. Particular key definition tables may also be chosen by depressing certain of the data entry keys.

An apparatus constructed in accordance with another embodiment of the present invention comprises a data entry terminal, a plurality of data entry keys associated with the data entry terminal, a scanner, a processor operative for running a data entry program, and first and second triggers associated with the housing. The data entry program has a plurality of key definition tables for defining the functions of the plurality of data entry keys. The first trigger enables the scanner when depressed and disables the scanner when released. When depressed, the second trigger is operative to select from the plurality of key definition tables.

Accordingly it is an object of the present invention to provide a handheld wireless terminal for data entry.

It is another object of the present invention to provide a data entry terminal that provides alternate modes of entering data into the terminal.

It is another object of the present invention to provide a handheld wireless data entry terminal that can withstand substantial amounts of physical abuse and that is capable of operating, even after prolonged exposure to moisture and/or extreme temperatures.

It is another object of the present invention to provide a handheld wireless data entry terminal that is in communication with a remote host computer.

It is an object of the present invention to provide a handheld data entry terminal that is lightweight and ergonomically balanced, allowing the terminal to be carried and used for extended periods of time without causing the user excessive fatigue.

It is yet another object of the present invention to provide a handheld wireless data entry terminal that runs a program having a stack of key definition tables which allow keys on the terminal to have multiple functions.

It is thus an object of the present invention to provide a handheld data entry terminal that runs a data entry program having a stack of key definition tables so as to minimize the number of terminal data entry keys and to maximize terminal display size.

It is another object of the present invention to provide a method for acquiring data in which a handheld wireless terminal having a plurality of data entry keys programmed to perform multiple data entry functions is utilized.

It is another object of the present invention to provide a data entry terminal with first and second triggers which control data entry functions, thus minimizing the number of terminal data entry keys.

It is another object of the present invention to provide a handheld data entry terminal that is battery powered, thus allowing the terminal to be used at locations remote from the associated host computer.

It is another object of the present invention to provide a handheld data entry terminal that allows a terminal user to program the terminal, at the terminal itself, to tailor data entry functions to the particular needs of the user. These and other objects, features, and advantages of the present invention may be more clearly understood and appreciated from a review of the following detailed description of the preferred embodiment and by reference to the appended drawings and claims.

BRIEF DESCRIPTION OF THE DRAWINGS

FIG. 1 is a front perspective view of the data entry terminal of the preferred embodiment of the present invention.

FIG. 2 is a rear perspective view of the data entry terminal of FIG. 1.

FIG. 3 is a side elevational view of the data entry terminal of FIG. 1.

FIG. 7 is a flow diagram illustrating the alternate methods of data entry of the data terminal of the present invention.

DETAILED DESCRIPTION OF THE PREFERRED EMBODIMENT

Figure 4:
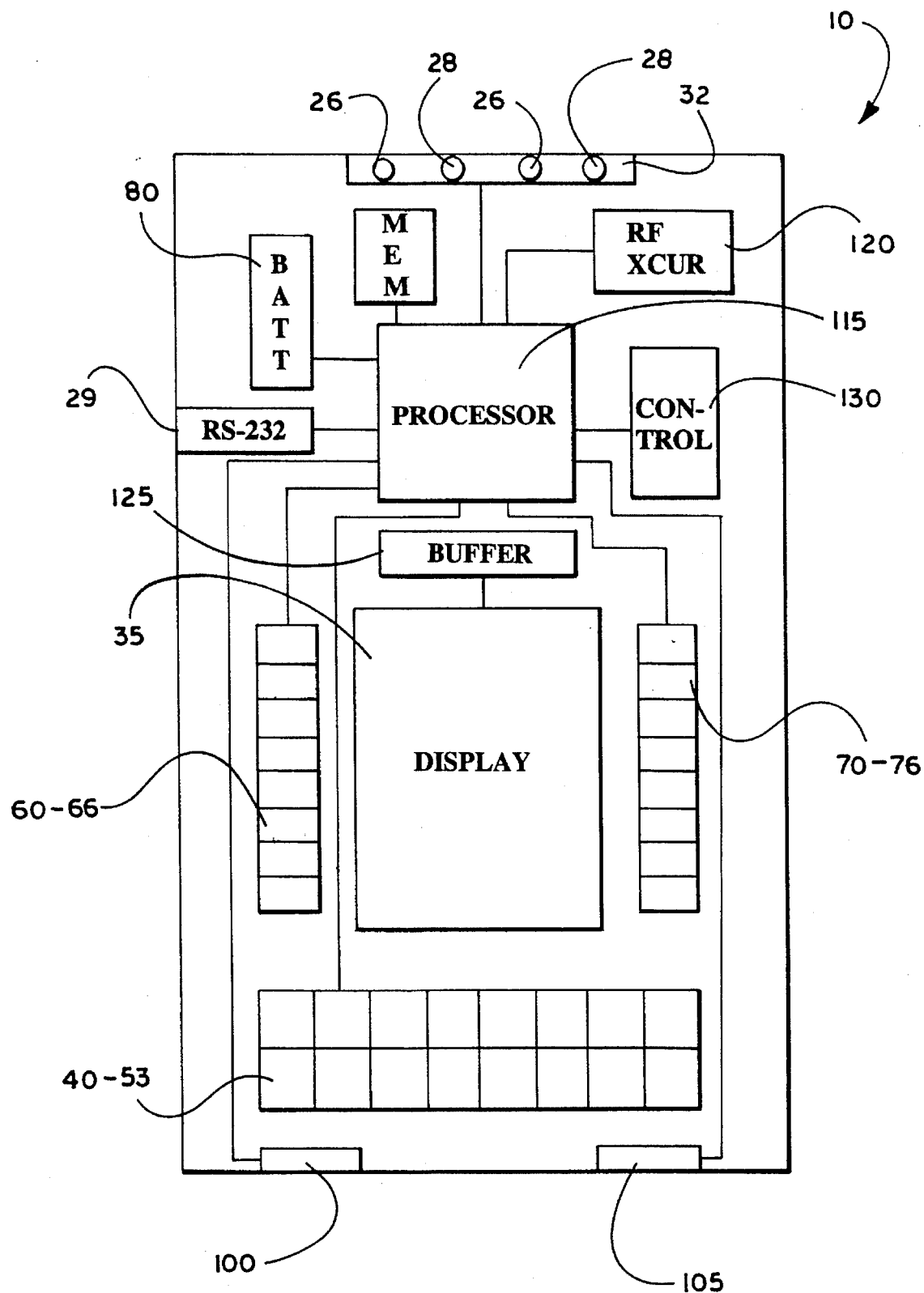
FIG. 4 is a block diagram of the hardware components of the data entry terminal of the present invention.

Turning now to the drawing figures in which like numbers reference like parts or steps, several embodiments of the present invention will now be described.

FIG. 1 shows a data entry terminal generally at 10 in accordance with the preferred embodiment of the present invention. The terminal is composed of a lightweight, high density plastic or of any other type of electrically non-conductive material that is capable of withstanding substantial amounts of physical abuse and that is resistive to extreme temperatures and moisture. The terminal 10 is preferably composed of multiple injection molded parts. The parts are preferably held together by plastic tabs and/or screws (not shown) in a manner well known to those skilled in the art.

The terminal 10 comprises three main sections: a main housing 20, a display face 25 that extends outwardly at an angle from the main housing toward a terminal operator (whose hand is shown), and a handle 30 extending downwardly from the main housing 20, each of which will now be described in more detail.

The main housing 20 is substantially hollow and contains a majority of the terminal's hardware components, which are discussed in detail below. The main housing 20 is designed and manufactured to prevent extreme temperatures, dirt, dust, moisture and other elements from affecting the hardware components inside. The main housing also contains a scanner 32 that is functional in a direction rearward that of the display face 25 and is comprised of a combination of visible red laser diodes 26 and photosensing elements 28 (see FIG. 4) that are capable of detecting and decoding coded graphical representations of data in a manner well known to those skilled in the art. Further, the main housing may also contain an RS-232 port 29 (see FIG. 4) that allows data to be transferred between the terminal and a peripheral device through a physical connection between the terminal and the peripheral device.

The display face 25 contains an LCD terminal display 35 of the type well known to those skilled in the art. The display 35 may also have a back light (not shown) associated with it to enable a terminal operator to read information on the display in a poorly lit environment. The display face 25 further contains keys 40–53 below the display 35. As will be discussed in detail below, these keys each have multiple key definitions which allow the terminal operator to select from a wide variety of data entry characters so as to correctly enter data into the terminal. The display face 25 also contains keys 60–66 along the left side of the display 35. These keys allow the user to move a program cursor (not shown) to a desired position on the screen and to perform other data entry functions described in detail below. The display face also contains keys 70–76 along the right side of the display 35. The functions of all 28 keys, referred to generally as the terminal data entry keys, will be discussed in greater detail below. Because the keys 60–66 and 70–76 must be mounted above a section of the display 25 and its associated circuitry lying under the display face 25, the display face 25 must have a chassis 78 deep enough to allow the keys 60–66 and 70–76 and the associated circuitry to be positioned along the sides of the display 35. Although the keys 40–53, 60–66 and 70–76 preferably have specific functions as described in detail below, it should be appreciated that these keys may be programmed through the host central computer to perform data entry functions in any manner consistent with the invention disclosed herein.

It should also be appreciated that terminal display size and/or terminal key numbers and locations may vary according to the particular type of data entry application or according to the needs of a particular type of terminal user. For example, if a group of warehouse data entry personnel must enter data consisting of product names and descriptions on a frequent basis, a terminal according to the present invention may be designed with at least 26 data entry keys located below the display to eliminate the need for toggling between two function tables to access both the a-m and n-z alpha character tables, as is necessary with the terminal shown in FIG. 5. For such an embodiment of the present invention, key definition tables could also be appropriately defined to conform to the altered key layout. Thus, the terminal may be structured in numerous ways without departing from the underlying objects of the present invention of (1) providing a terminal with a wide variety of data gathering functions stored in a key definition table stack, (2) maximizing the terminal screen size and (3) minimizing the number of keys on the terminal necessary to enter data into the terminal. As the inventors are not sure which embodiment of the present invention is the best mode, they believe that the choice should be made after consideration has been given to the resultant advantages and disadvantages of each of the numerous possible terminal configurations.

As shown in FIGS. 2 and 3, the terminal handle 30 is substantially cylindrical and extends downwardly from the terminal housing and terminates in a spherical stop 85 which helps to prevent the terminal handle from slipping through the terminal operator's grip in damp operating conditions or when the terminal operator must perform a physical function, such as climbing a ladder or driving a forklift, in addition to holding onto the terminal 10. The terminal handle 30 allows a terminal operator to hold the terminal 10 in a manner that positions the terminal display and keys in an accessible position for the terminal operator and allows the terminal operator to comfortably hold the terminal for extended periods of time with minimal effort and discomfort.

The terminal handle 30 houses a terminal battery power supply 80 (see FIG. 4) which provides power to the terminal 10. Preferably, rechargeable batteries are used. However, any type of power supply well known to those skilled in the art may be used.

The terminal handle 30 also contains first and second data entry control triggers 100 and 105. The first trigger 100 initiates power to the terminal when the terminal is in an "off" state, enables and disables the scanner 32, and allows the terminal operator to send data to the host computer once data is entered into the terminal. The second trigger 105 allows the terminal operator to scroll through the alternate key definition tables of the data entry program and to enter selected data into the terminal. The triggers 100 and 105 allow the terminal 10 to be designed with a minimum number of multi-function keys, while the minimum number of keys thus allows the terminal to be designed with a display of maximum size. These and other functions of the triggers 100 and 105 will be discussed in greater detail below.

The undersides of the main body 20 and the display face chassis 78, together with the handle 30, define a support surface 110 that allows the terminal operator to place a substantial amount of the terminal's weight upon his or her hand, wrist and lower arm. The weight of the terminal is thus distributed upon the operator over a greater surface area than if the operator had to support the terminal solely via the terminal handle. Thus, the terminal 10 is ergonomically balanced, prevents user fatigue resulting from carrying the terminal for long periods of time and allows the user to easily operate the terminal with one or two hands without the need for a supporting surface.

FIG. 4 shows in block diagram form the components of the data entry terminal. A terminal processor 115 is operative to receive and store the data entry program downloaded from the host computer through an RF transceiver 120. The RF transceiver 120 communicates with the host computer using conventional FM frequency-hopping spread spectrum transmission protocol as described in U.S. Pat. No. 5,287,384 issued Feb. 15, 1994, which is assigned to the assignee of the present invention. The RF transceiver, in addition to receiving information from the host computer, also is capable of sending data to the host computer when the processor detects a SEND command. As previously discussed, the terminal may also communicate with the host computer when the terminal is physically connected to the host computer through the RS-232 link 29.

FIG. 4 also shows that the terminal 10 has a power control circuit 130. Upon power-up, the terminal 10 initiates a retriggerable counter in the power control circuit 130. This counter is programmable by the terminal operator and has a default timeout value of 3 minutes. This function allows battery power to be conserved during periods of non-use. Upon the trigger 100 being depressed and released, the counter is reset to zero, the processor 115 connects to the battery 80 and the terminal 10 is enabled for data entry. When the counter reaches its timeout value, the processor 115 disconnects the battery 80. Input/output events from the keypad, the scanner 32, the RS 232 port or the RF transceiver may also retrigger the counter to its initial value of zero.

Figure 5:
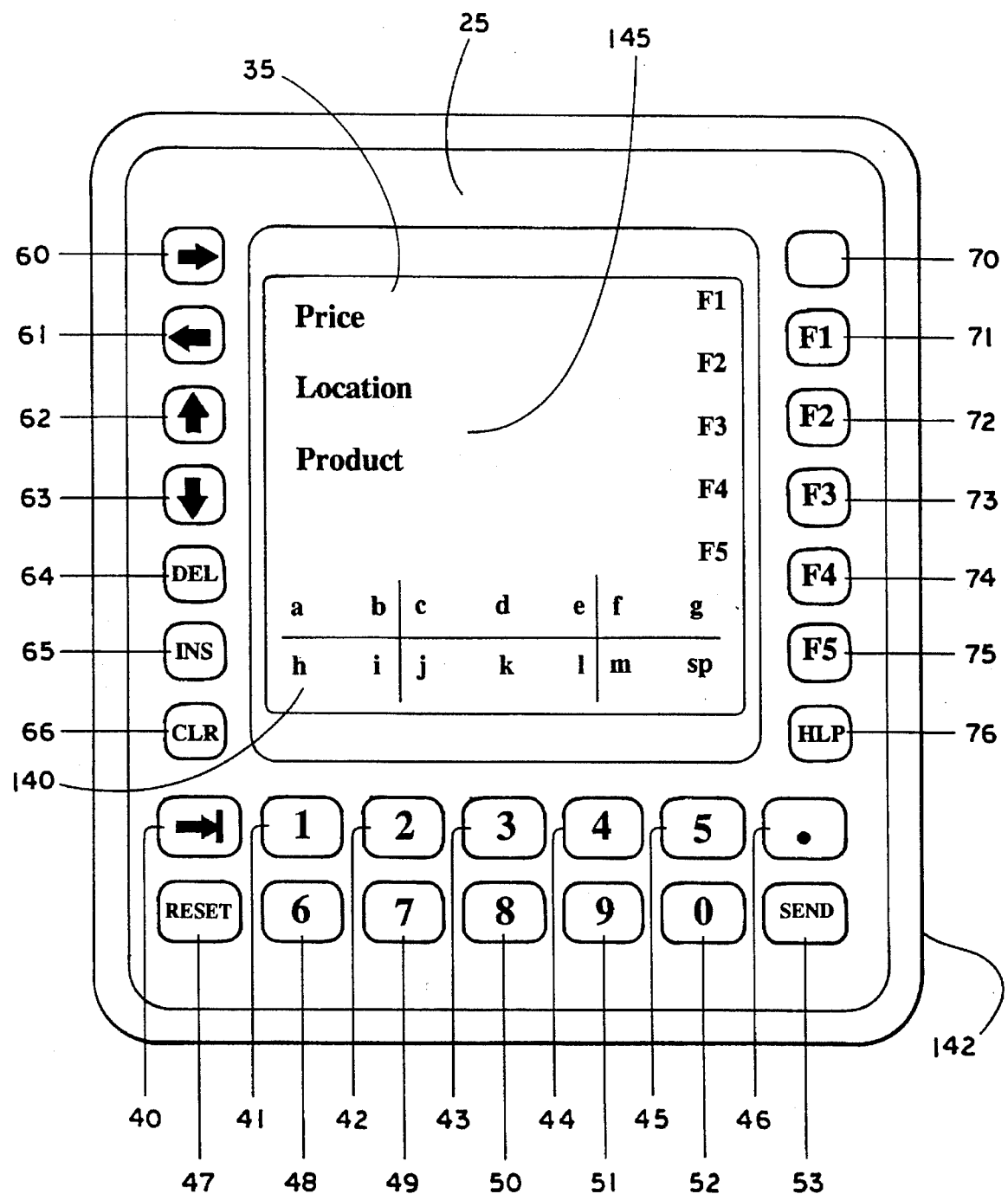
FIG. 5 is a front view of the front face of the data entry terminal of FIG. 1 showing the display and the keypad thereof.

FIG. 5 shows a front view of the face 25 of the terminal 10 in accordance with the preferred embodiment of the present invention. As can be seen, symbols representing the default functions of the keys 40–53, 60–66 70–76 are imprinted on the keys, while alternate stack definitions for character and function tables in the stack appear on an overlay for keys 40–53 and 70–76. The data entry program preferably has 19 alternate key definition tables. The different key definition tables are accessed through manipulation of the triggers 100 and 105 in a manner described in detail below.

Below the display 35, the fourteen keys 40–53 are mapped, by the key definition tables, to perform alpha, numeric and punctuation data entry functions using English language characters and, alternatively, characters from foreign languages. The keys may also be programmed at the terminal 10 by the terminal operator. The data entry program preferably has at least one programmable key definition table through which the keys may be grouped to fit a particular terminal operator's data entry needs. To define the keys, the operator scrolls to the programmable key definition table and, through a sequence of key depressions (particular key depressions will vary depending upon the particular functions associated with each key for each terminal mode and the particular data entry program), defines the function of each key 40–53 for that particular key definition table. Alternatively, the programmable table may be loaded through a data file transmitted from that application to the data terminal via the RF data link or the RS-232 port. The operator-defined key definition table is then stored in the key definition table stack in sequential order with the existing key definition tables, and may be selected by the user in a manner that will be described in detail below. The sequential order in which the operator-defined key definition table (or of any of the key definition tables) is stored in the key definition table stack may also be re-defined by the terminal operator or application programmer to further tailor the data entry program to fit his or her data entry needs. For example, if the operator wants the operator-defined key definition table to be the default key definition table appearing upon power up of the terminal, the operator may move this key definition table to the beginning of the stack through selection and depression of the proper function key or keys.

To the left of the display 35, each of the keys 60–63 controls the movement of the cursor on the screen correlative to the direction of the arrow on the key. The key 64 is a DELETE key that allows the terminal operator to delete data mistakenly entered into the buffer. The INSERT key 65 allows the terminal operator to insert data between two data characters. The CLR key 66 allows the terminal operator to clear data incorrectly entered into the buffer 125. The keys 60–66 thus function in a manner that is similar to the functions of similarly named keys in the word processing arts.

To the right of the display 35, the key 70 is a TOGGLE key that allows the terminal operator to alternate between two selected key definition tables. The five keys 71–76, labeled F1–F5, are mapped to perform functions such as selecting among a specific language, including, but not limited to, English, French, German and Spanish. The five keys, labeled F1–F5, are also mapped to perform terminal emulation functions to format the keystrokes, entered into the terminal 10, into data readable from such terminals as LDS, 5250, 3270 or ANSI terminals. These function keys can have a predefined string of keystrokes that are "played" into the terminal emulation as though the keystrokes came from the keyboard. The definition of these strings of keystrokes is through a set-up menu or via a data file transmitted from a network management workstation console (not shown). Such terminal emulation functions are well known to those skilled in the programming arts and need not be further discussed. The key 76 is a HELP key and is mapped to tables having information on the use and operation of the terminal 10.

The display 35 reflects a map, shown generally at 140, that indicates the current definition of each key for the current key definition table. The map 140 shown in FIG. 5 indicates that the current key definition table is the lowercase a-m key definition table for keys 40–53 and the default functions (LDS, ANSI, 3270 and 5250 emulation specific) for the keys 71–76. The map 140 is present to enable the terminal operator to distinguish the current function of each key, thus eliminating the need to commit the 19 function tables available in the preferred embodiment to memory and the need to refer to a written reference, such as a key template, with small difficult to read text. The display further reflects the grid 145, which is present to aid the terminal operator in distinguishing the individual key definitions on the map. The lines of the grid 145 appear as solid lines while the keys are being used for data entry and as dashed lines while the triggers 100 and 105 are alternatively being used for a one-handed mode of data entry, as will be described in detail below. The display also reflects the data entry prompts PRICE, LOCATION, and PRODUCT #, shown generally at 145. These prompts indicate to the terminal operator specific product data to be entered into the terminal. These prompts will vary according to the data entry parameters of the specific data entry program.

The first and second triggers 100 and 105 provide the terminal operator with a variety of data entry controls and allow the terminal to be designed with a minimal number of data entry keys. The functions of each will now be discussed in detail.

The first trigger 100 of the terminal 10 has five associated functions. First, the trigger 100 initiates power to the terminal 10 when the terminal is in an OFF state. When the trigger 105 is depressed and released, the processor connects the battery 80 and the terminal is enabled for data entry.

Second, the trigger 100 enables and disables the scanner 32. When the trigger is depressed and held down, the scanner is enabled and the scanner mode of data entry is entered. The scanner will remain enabled in this state until the trigger 100 is released, a valid coded representation of data is detected, or the counter times out.

Third, the trigger 100 provides character scrolling in the keypad data entry mode. Using the trigger 100, the terminal operator can thus click (i.e. quickly depress and release) the trigger to scroll through, and select from, the map of characters in a selected table without having to select the characters via the keypad. This feature allows the terminal to be operated completely with one hand without the need to hold the terminal with one hand and enter data via the keypad with a second hand.

Fourth, the trigger 100, in combination with the trigger 105, provides key definition table scrolling in reverse order. By depressing and holding the trigger 100 and subsequently depressing and releasing the trigger 105, the stack of key definition tables may be scrolled through in an order reverse that of depressing and releasing the trigger 105.

Fifth, the trigger activates a means for sending input data to the host computer. Once appropriate data is entered into the buffer 125, it is communicated, via the RF transceiver 120, to the host computer by a double click of the first trigger 100. The trigger 100 can be used to send data regardless of whether the scanner or the keypad is used for data entry.

It should be appreciated that the term "double click" means that the trigger is quickly depressed and released twice in rapid succession. After the trigger is once depressed and released, a timer in the processor is enabled. If the timer does not time out before the trigger is depressed and released again, the processor detects a double click of the trigger. If the timer does time out before the trigger is again depressed and released, the processor treats this as a single click of the trigger.

Table 1 below summarizes the functions of the trigger 100:

TABLE 1

| Terminal State | Trigger Function | Trigger Operation |
| --- | --- | --- |
| Power off | Terminal power on | Depress and release trigger. |
| Normal operation | Activate scanner | Depress and hold trigger. Scanner will continue to operate until trigger is released, a valid bar code is detected or the controller times out. |
| AKD state | Enter trigger data entry state. Scroll through alternate key definitions. (The purpose for this mode is to provide an opportunity to key input data with one hand). | Depress and release trigger. Each trigger activation highlights and displays the next screen character in reverse video. The character is highlighted upon release of the trigger. Sequence is left to right top to bottom. |
| AKD state | AKD scroll reversal | Depress and hold trigger 100. Depress and release trigger 105. AKD stack decremented by one. Do not enter trigger data entry state on trigger 100 release. |
| Normal operation | SEND, (i.e. transmit data) | Double key click initiates programmable function, default value = SEND function. |

The second trigger 105 also has five associated data input functions. First, the trigger 105 allows a terminal operator to enter into the keypad mode of data entry. When the trigger 105 is depressed and released once, the first key definition table map in the key definition table stack is displayed. The terminal operator, upon entering the keypad mode of data entry, can subsequently enter data via the keypad or via the first trigger 100 as described above.

Second, the trigger 105 features a short cut alternative to scrolling through the key definition tables. When the trigger 105 is depressed and held in the depressed state and the appropriate root key is depressed, the key definition (or function) table corresponding to that particular root key will be selected and the appropriate map will be displayed. This feature eliminates the need to progressively scroll through the key definition tables if one is familiar with the location of the tables in the key definition table stack. Below, Table 2 contains the default root key table identification (and title) number map.

TABLE 2

| Root key definition | Character table ID # (root) | Function table ID # (root) | Default stack pointer |
|---|---|---|---|
| 1 | 1. edit | 1. f6 | 1 |
| 2 | 2. a–m | 2. f11 | 2 |
| 3 | 3. n–z | 3. f16 | 3 |
| 4 | 4. P1 | 4. f21 | 4 |
| 5 | 5. P2 | 5. f26 | 5 |
| 6 | 6. 0–9 | 6. f30 | 6 |
| 7 | 7. USR1 | 7. f35 | 7 |
| 8 | 8. USR2 | 8. | 8 |
| 9 | 9. USR3 | 9. CMD | 9 |
| 0 | 10. USR4 | 10. HotK | 10 |
| F1 | 11. Fr | 11. LDS | 11 |
| F2 | 12. Ger | 12. 5250 | 12 |
| F3 | 13. Sp | 13. 3270 | 13 |
| F4 | 14. Scand | 14. ANSI | 14 |
| F5 | 15. Intl | 15. PA | 15 |
| TAB | 16. ˆa–m | 16. USR1 | 16 |
| RESET | 17. ˆn–z | 17. USR2 | 17 |
|  | 18. A–M | 18. USR | 18 |
| SEND | 19. N–Z | 19. USR4 | 19 |

This short cut function may be utilized for all 19 key definition tables in the preferred embodiment of the present invention.

Third, the trigger 105 is functional to progressively scroll through the stack of key definition tables. Each time the trigger 105 is depressed and released, the key definition table subsequent to the one whose key definition map is presently displayed becomes enabled, and the appropriate key definition map appears on the display 35. Although utilizing this feature takes longer to reach a desired key definition table than the aforementioned second feature, the terminal operator need not remember root key definitions and need not be particularly familiar with the terminal in order to use the terminal for data entry purposes.

Fourth, the trigger 105 is functional for entering data into the terminal. As a character is selected and highlighted by the first trigger 100 as mentioned above, the character is entered into the terminal buffer 125 when the trigger 105 is depressed and released. This function, in combination with the aforementioned character scrolling function of the first trigger 100, allows data to be entered with one hand and thus leaves the terminal operator's other hand free to steer a forklift, to aid the operator in climbing a ladder, or to aid the operator in performing some other task.

Fifth, the trigger 105 is functional in a TAB forward mode, in which a double click of the trigger allows the terminal operator to tab directly to a desired key definition table. This TAB forward mode is programmable by the terminal operator to allow the terminal operator to tab directly to key definition tables that are most often used, thereby eliminating the need to scroll through key definition tables that are seldom used and decreasing the time necessary to enter data via the keypad mode of data entry.

Table 3 below summarizes the functions of the trigger 105:

TABLE 3

| Terminal State | Trigger Function | Trigger Operation |
|---|---|---|
| Normal operation | Enter AKD state, Display first table on the AKD table stack. | Depress and release trigger, First table on AKD stack is displayed on release of trigger. |
| Normal operation | AKD table short cut. | Depress and hold trigger. Depress keypad key corresponding to the desired table identification number. Selected key (function) table will be presented on the display when corresponding table key is depressed. |
| AKD entry state | Scroll through AKD tables. | Depress and release trigger. Each trigger activation increments and displays the next key definition table on the screen. Display is updated when trigger is released. |
| Trigger data entry state | Enter character | Depress and release trigger. (trigger 100 has been previously depressed and held down.) Enter high-lighted character in current cursor position. Return to root key definition. |
| Normal operation | TAB forward (programmable) | Double key click initiates TAB forward function. |

Figure 6:
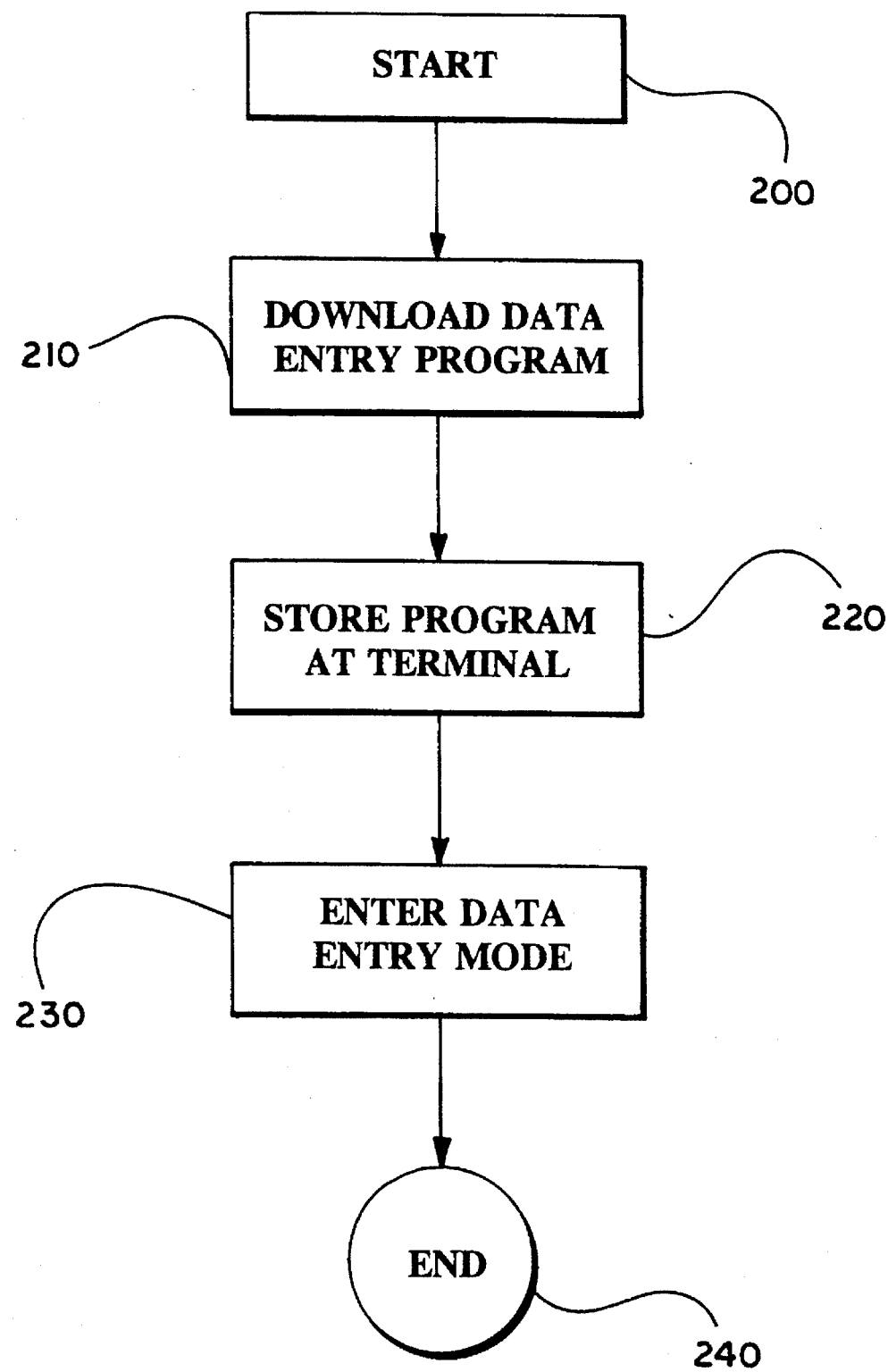
FIG. 6 is a flow diagram illustrating the preferred method of initialization of a data entry program at the data entry terminal from a remote host computer.

Operation of the data entry terminal 10 will now be described in terms of its aforementioned components. In FIG. 6, the terminal is powered up at step 200. At step 210, a data entry program is downloaded from the host computer to the processor 115 via the RF transceiver 120. Individual key functions are defined by this program. The program provides flexibility to the terminal operator by allowing the terminal operator to define one or more key definition tables himself or herself at the terminal and allows the terminal operator to tailor other terminal data entry functions to his or her individual needs. At step 220, the program is stored at the processor 115 and is activated for data entry upon either the terminal scanner 32 or the terminal keypad being enabled.

Once the data entry program is downloaded, it remains initialized in a non-volatile memory. At step 230, the terminal enters a data entry mode. At step 240, data entry is completed and the counter in the power control circuit 130 decreases power flow to the processor 115 after a predetermined period of non-use has elapsed, thereby conserving battery power.

FIG. 7 is a logical flow diagram of the program that controls the functions of the data entry terminal 10. In FIG. 7, once the program is downloaded from the host computer and the terminal enters data entry mode at step 305, either the scanner mode of data entry or the keypad mode of data entry may be selected at 310. At step 310, if the scanner is functional and the data to be entered is appropriately coded (i.e. is bar-coded), the scanner mode of data entry may be selected by depressing the first trigger 100, which enables the terminal scanner 32 at step 320. The scanner 32 is then pointed at the coded representations of data, and the data is then scanned at step 330. If, at step 335, the appropriate coded representations of data are successfully scanned into the buffer 125, the terminal indicates to the terminal operator that the scan was successful. The terminal may indicate that the scan was successful through an audible or a visual prompt. At step 335, if the data is not successfully scanned into the buffer 125, a subsequent scan or scans may be attempted, or the data may be entered via the keypad, as indicated beginning at step 360 and as discussed in detail below. If the scan is successful, at step 340, after all appropriate data has been entered into the buffer 125 and the processor detects the appropriate command, i.e. the SEND key 53 is depressed or the second trigger 105 is double clicked, the data is sent to the host computer through the RF transceiver 120.

At step 310, or upon an unsuccessful scan at step 335, data may alternatively be entered through the terminal keypad. The keypad mode of data entry thus provides an alternate mode of data entry if the scanner is damaged or otherwise non-functional, or if the data to be entered is not properly coded and thus cannot be read by the scanner. At step 360, the keypad is enabled for data entry when the second trigger 105 is depressed and released. At step 365, the first key definition table is enabled and its corresponding key definition table map appears on the display 35. At step 370, the processor checks for a command to switch key definition tables. If no such command is detected, the method proceeds to step 380 and data is entered through the terminal keypad. If the first key definition table does not define the keys in a manner proper for correct data entry and the processor receives a command to change key definition tables, at step 375 the processor receives commands, either from the keypad or the triggers 100 and 105, to enable the desired key definition table to properly define the keys. Subsequent to step 375, the method proceeds to step 380 and data is entered into the terminal.

At step 385, if all data has been entered, the processor, upon detecting that the trigger 105 has been double clicked or that the SEND key has been depressed, communicates data entered into the buffer 125 to the host computer through the RF transceiver 120 at step 395. If all data has not been entered, the method proceeds to step 390. After each data character is entered, the key definition table may be switched to another alternate key definition table for proper data entry. If an alternate key definition table is needed, the method returns to step 375 where the alternate key definition table is selected for proper data entry at step 380. Steps 375–390 are repeated until all data is entered, at which time the processor, upon receiving a SEND command, sends the data to the host computer at step 395. The counter then decreases power flow from the battery at step 400 after the counter times out.

From the foregoing description of the preferred embodiment of the present invention, other embodiments of the present invention will suggest themselves to those skilled in the art. Particular details of the preferred embodiment are included to fully disclose the best mode of the invention contemplated by the inventor and should not be taken as limiting of the scope of the present invention. Therefore, the scope of same is to be limited only by the claims below and equivalents thereof.

We claim:

1. A wireless data entry terminal, comprising:
    a terminal housing;
    a processor located within said housing, said processor operative for running a data entry program having a plurality of key definition tables;
    a data transceiver located within said housing and operatively connected to said processor, said data transceiver operative for receiving said program from a remote host computer and routing said program to said processor, said data transceiver being further operative for transmitting data entered at said terminal from said terminal to said host computer; and
    a set of data entry keys on said housing,
    at least one key of said set of data entry keys operative for scrolling through said plurality of key definition tables,
    a subset of said set of data entry keys operative for entering data in a manner defined by a particular key definition table selected from said plurality of key definition tables.

2. A wireless data acquisition terminal as recited in claim 1, wherein at least one key of said set of keys commands said data transceiver to send said data to said host computer via said data transceiver.

3. A wireless data acquisition terminal as recited in claim 1, further comprising a buffer into which said data is entered and stored until said data is sent by said data transceiver to said remote host computer.

4. A wireless data acquisition terminal as recited in claim 1, further comprising a scanner located within said housing for selectively scanning coded representations of data to be sent by said data transceiver to said remote host computer.

5. A wireless data acquisition terminal as recited in claim 4, further comprising first and second triggers, said first trigger operative to enable and disable said scanner, said second trigger operative to select a key definition table from said plurality of key definition tables.

6. A wireless data acquisition terminal as recited in claim 5, wherein said terminal may be held and operated with one hand.

7. A wireless data acquisition terminal as recited in claim 5, wherein said first and second triggers are located on a handle connected to said housing.

8. A wireless data acquisition terminal as recited in claim 1, further comprising a display for displaying each function associated with each specific key for a selected key definition table, and for displaying said data entered into said terminal before said data is sent to said host computer.

9. A wireless data acquisition terminal as recited in claim 8, wherein said display is positioned so that a terminal operator may hold said terminal and enter data into said terminal while simultaneously reading said display.

10. A wireless data acquisition terminal as recited in claim 1, wherein each of said key definition tables in said plurality of key definition tables has a corresponding key definition map appearing on said display as each of said key definition tables is selected.

11. A wireless data acquisition terminal as recited in claim 1, wherein said data transceiver is a radio frequency data transceiver.

12. A wireless data acquisition terminal as recited in claim 1, wherein a subset of said data entry keys is programmable from said terminal.

13. A hand held data entry terminal, comprising:
    a terminal casing, said casing comprising a face, a housing and a handle extending therefrom;
    a processor located in said housing for implementing a program having a plurality of key definition tables, for storing collected data and for downloading said collected data to a host computer system;
    a display mounted in said face;
    a set of keys peripherally located around said display, at least one of said set of keys operative for scrolling through said plurality of key definition tables, a subset of said set of data entry keys operative for entering data in a manner defined by a key definition table selected from said plurality of key definition tables,
    said display operative for displaying said data as said data is entered,
    said display further operative for indicating each particular key definition for a selected key definition table;

a scanner mounted in said casing that, when enabled, scans said data into said processor; and first and second triggers located on said handle, said first trigger operative to enable and disable said scanner, said second trigger operative to scroll through and select one of said plurality of key definition tables;

whereby said plurality of key definition tables reduces the number of keys needed to perform data entry functions, increases the area available on said face for said display and reduces terminal size to enable said terminal to be held and operated with one hand.

14. A handheld data entry terminal as recited in claim 13, wherein said first trigger is further operative to turn on a power supply in said terminal to allow said terminal to perform data entry functions.

15. A handheld data entry terminal as recited in claim 13, wherein said first trigger is operative to scroll through and highlight specific data characters.

16. A handheld data entry terminal as recited in claim 15, wherein said second trigger is operative to enter said data characters highlighted by said first trigger.

17. A handheld data entry terminal as recited in claim 15, wherein said first trigger, in combination with said second trigger, is operative to scroll through said key definition tables in reverse order.

18. A handheld data entry terminal as recited in claim 13, wherein said first trigger is operative to send data to said host computer system.

19. A handheld data entry terminal as recited in claim 13, wherein said second trigger is operative to activate said set of keys for data entry.

20. A handheld data entry terminal as recited in claim 13, wherein said second trigger is operative to tab directly to a specific one of said key definition tables.

21. A method for acquiring data, comprising the steps of:

providing a host computer;

providing a wireless data acquisition terminal in communication with said host computer, said terminal having a processor, a data entry scanner, a plurality of data entry keys and a display;

downloading a program, having a plurality of key definition tables, from said host computer to said wireless data acquisition terminal;

at said wireless data acquisition terminal, selecting a key definition table from said program;

indicating on said display each key definition associated with each key in said selected key definition table;

providing prompts at said display for data entry;

entering data at said terminal;

if necessary, selectively switching among said key definition tables to correctly enter said data;

displaying said entered data at said terminal; and sending said entered data to said host computer via a wireless data transceiver in said terminal.

22. A method for acquiring data as recited in claim 21, further comprising the steps of scanning coded representations of said data into said terminal through said scanner before said step of selectively choosing a key definition table from said program.

23. A method for acquiring data as recited in claim 21, further comprising the step of providing first and second control triggers on said terminal.

24. A method for acquiring data as recited in claim 23, further comprising the step of disabling said scanner by depressing said first control trigger on said terminal before said step of selectively choosing a key definition table from said program.

25. A method for acquiring data as recited in claim 23, wherein said step of selectively choosing a key definition table from said program comprises depressing and releasing said second control trigger on said terminal to scroll through said plurality of key definition tables.

26. A method for acquiring data as recited in claim 21, wherein said step of selectively choosing a key definition table from said program comprises depressing certain of said plurality of data entry keys.

27. An apparatus, comprising:

a data entry terminal;

a plurality of data entry keys associated with said data entry terminal;

a scanner associated with said data entry terminal;

a processor operative for running a data entry program having a plurality of key definition tables for said plurality of data entry keys;

a first trigger associated with said housing for enabling said scanner in a first state and disabling said scanner in a second state; and a second trigger associated with said housing, said second trigger inoperative in said first state and operative in said second state for selecting from said plurality of key definition tables.

* * * * *